United States Patent Office 3,652,458
Patented Mar. 28, 1972

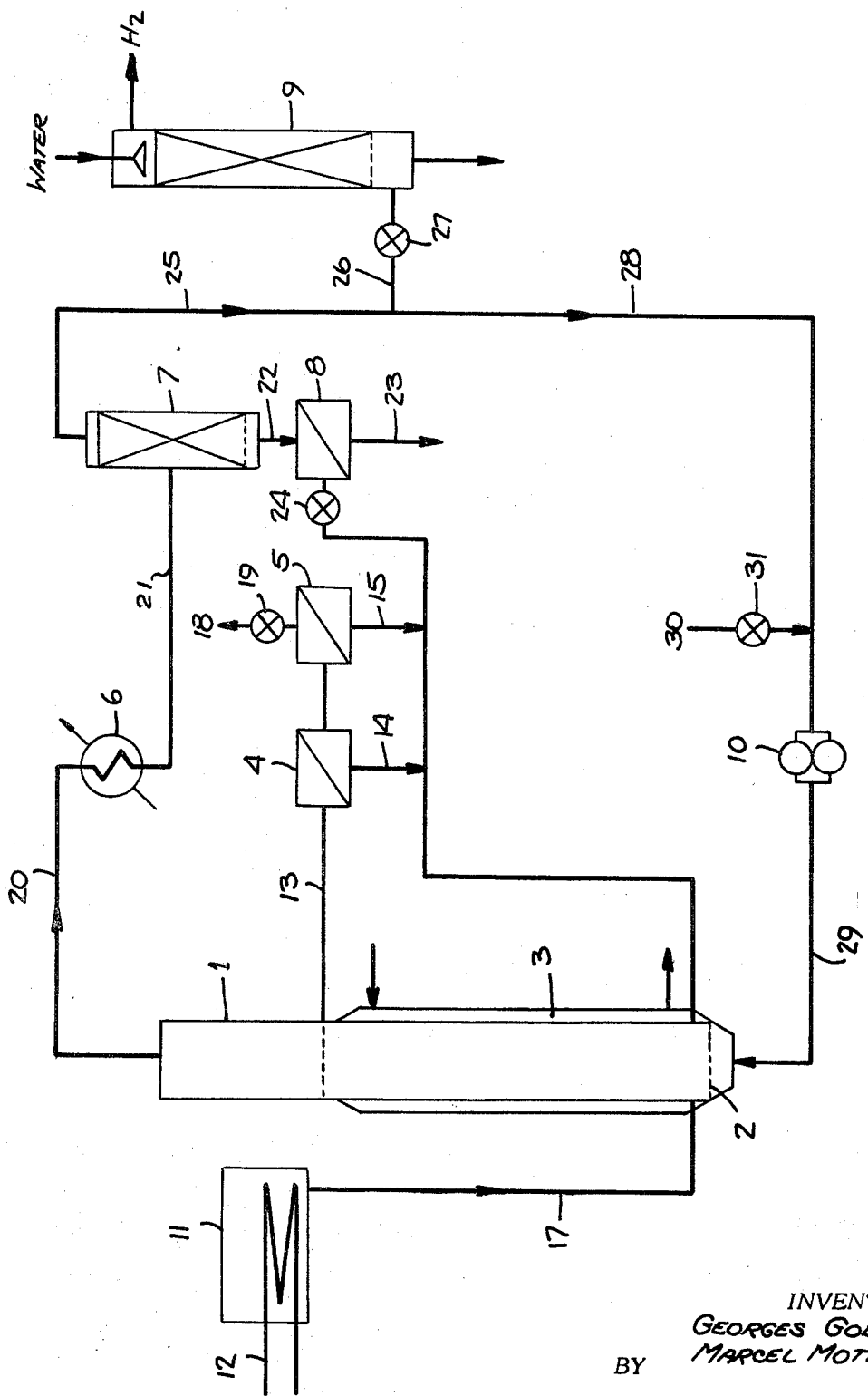

3,652,458
HYDROGENATION CATALYSTS COMPRISING NICKEL OR COPPER DEPOSITED ON SILICA
Georges Gobron, Melle, France, and Marcel Motillon, deceased, late of Melle, France, by Jacqueline Sudan, Caluire, Colette Viaud, Melle, and Jeannine Motillon and Michel Motillon, Caluire, France, legal heirs
Continuation-in-part of application Ser. No. 626,964, Mar. 30, 1967. This application Nov. 7, 1969, Ser. No. 874,877
Int. Cl. B01j 11/22, 11/40
U.S. Cl. 252—454    4 Claims

ABSTRACT OF THE DISCLOSURE

This disclosure describes hydrogenation catalysts comprising nickel or copper deposited on a highly pure silica carrier. The catalysts are prepared by reaction between a water soluble salt of the metal and an alkaline reagent such as sodium hydroxide in water. The insoluble metallic compound which precipitates is washed and dried. It is then reduced with hydrogen at an elevated temperature.

RELATED APPLICATION

This application is a continuation-in-part of copending patent application Ser. No. 626,964, filed Mar. 30, 1967 now abandoned.

BACKGROUND OF THE INVENTION

This invention is concerned with novel hydrogenation catalysts comprising defined quantities of nickel or copper deposited on a silica carrier of defined surface area and purity. It is concerned also with procedures for the preparation of these valuable materials.

A large amount of research effort has been expended in attempts to improve hydrogenation catalysts suitable for use in industrial operations. Despite this major effort, no completely satisfactory catalysts have yet been prepared.

THE INVENTION

It has been discovered in accordance with this invention that it is possible to produce hydrogenation catalysts of the above defined class having a very high order of activity and comprising a very pure silica carrier with a specific surface area of at least 80 square meters per gram, and at least 70% by weight of nickel or copper catalyst on the carrier based on the total weight of the metal and carrier.

The silica carrier utilized in this invention is of a purity which is preferably at least 95% by weight and most desirably above 99% by weight. The usual purity of the kieselguhr form of silica normally employed in commercial operations is from 60% to 90%. The specific area of the carrier may be as high as 380 square meters per gram, or even higher. One suitable carrier for use in carrying out this invention is the flake shaped silica available commercially under the trademark Aerosil, which is available in grades of specific surface area up to about 380 sq. m./g. and in purity ranges up to about 99.8%.

The weight proportion of the metal catalyst with respect of the total weight of the metal plus carrier may be as high as about 90%, and is preferably from about 75% to about 85%.

The significance of the specific area of the carrier and the proportion of metal catalyst with respect of the total weight is illustrated by the following data obtained from batchwise, liquid phase hydrogenation of benzene to cyclohexane. All experiments were carried out under similar conditions, except with regard to the catalyst used:

(A) Using a catalyst in accordance with the present invention, comprising, by weight, 80 parts of nickel deposited on 20 parts of a carrier made of silica of 99.8% purity and having a specific area of 130 m.$^2$/g., it was found that after one hour 56% of the starting benzene was hydrogenated.

(B) Using a catalyst comprising, by weight, only 50 parts of nickel deposited on 50 parts of the same carrier as in experiment A, it was found that after one hour only 36% of the starting benzene was hydrogenated. Accordingly, the activity of the catalyst is only 64.5% of that of the catalyst in experiment (A).

(C) Using a catalyst comprising, by weight, 80 parts of nickel deposited on 20 parts of a carrier made of silica of 99.8% purity and having a specific area of 50 m.$^2$/g., it was found that after one hour only 39% of the starting benzene was hydrogenated. Accordingly, the activity of the catalyst is only 69.5% of that of the catalyst in experiment (A).

(D) Using a catalyst comprising, by weight, 80 parts of nickel deposited on 20 parts of a kieselguhr carrier (silica carrier having a specific area of only 30 m.$^2$/g.), it was found that after one hour only 17% of the starting benzene was hydrogenated. Accordingly, the activity of the catalyst is only 30.5% of that of the catalyst in experiment (A).

(E) Using a catalyst comprising, by weight, only 50 parts of nickel deposited on 50 parts of the same kieselguhr as in experiment (D), it was found that after one hour only 10% of the starting benzene was hydrogenated. Accordingly, the activity of the catalyst is only 18% of that of the catalyst in experiment (A).

The catalysts of the invention can be advantageously used for carrying out any and all hydrogenation operations in which nickel or copper catalysts are generally useful, whether such operations are preformed in liquid phase or in vapor phase. There may be mentioned, more particularly, hydrogenation reactions of carbonyl groups and/or olefinic linkages, for example, hydrogenation of furfural to furfuryl alcohol, of furfuryl alcohol to tetrahydrofurfuryl alcohol, of crotonaldehyde to butanol, of mesityl oxide or methyl isobutyl ketone to methyl isobutyl carbinol; olefins such as propylene to paraffins such as propane; hydrogenation of aromatic hydrocarbons such as benzene to cycloaliphatic hydrocarbons such as cyclohexane; hydrogenation of nitro or nitrile groups to amino groups; or conversion, in the presence of ammonia and hydrogen, of imines to amines, and the like.

Preferably, in the preparation of the catalysts in accordance with the invention, for effecting deposition of the metal catalyst on the carrier on reacts an aqueous solution of a water-soluble salt of the metal, in the presence of the carrier, with an aqueous solution of an alkaline reagent which is capable of causing precipitation of a water-insoluble compound of the metal, such as a hydroxide, an oxide, or a basic carbonate. The alkaline reagent may be, for example, sodium hydroxide or sodium carbonate or a mixture thereof.

In the case of nickel it is possible to introduce the alkaline reagent solution into the nickel salt solution admixed with the carrier or, alternatively, to introduce the metal salt solution into the alkaline reagent solution admixed with the carrier. On the other hand, in the case of copper it has been found that an actual practice the former of these two operating modes does not give very satisfactory results, so that the latter is preferred. In both cases it is alternatively possible to introduce the metal salt solution admixed with the carrier into the alkaline reagent solution.

The mixture of carrier and precipitate deposited thereon is then washed with water to remove as much as possible of the alkalinity of this mixture. It is then filtered, at least partly dehydrated or dried and finally is preferably formed into suitable shape, for example, in the form of pellets. These operations are carried out in accordance with the methods conventionally used in the preparation of nickel-on-carrier or copper-on-carrier catalysts. Before use, the so-prepared catalyst is reduced by hydrogen at elevated temperature. With nickel catalysts the temperature is from about 320° C. to 520° C., preferably from 450° C. to 500° C. It is from about 120° C. to 200 C., preferably from 150 C. to 170° C. in the case of a copper catalyst.

It will be clear from the results of the tests given above, and from the examples given hereinafter that, in accordance with this invention, it has been discovered that marked and unexpected increases in kind in the activity of nickel or copper on silica catalysts are possible by increasing three parameters, namely, the purity of the carrier, the surface area of the carrier, and the metal content of the catalyst. The unexpected magnitude of the increase in activity is clear from a comparison of the results in Tests (A) and (B) above, with the results of tests (C) and (D) and Test (E).

In these tests benzene was hydrogenated with various catalysts including a catalyst within the scope of the invention Test (A).

In Test (A) the percent conversion of benzene to cyclohexane was 56%. The amount of nickel on the carrier was 80 parts by weight. In Test (B) the same carrier was used, but the amount of nickel was only 50 parts by weight. The conversion was 36%. The difference in activity of the catalysts in Tests (A) and (B) was 20%, and this must be attributed to the difference in metal content of the catalysts since all other variables were held constant.

In Test (C), the proportion of nickel and the purity of the carrier were identical with those of Test (A); the difference in activity of the catalysts in Tests (A) and (C) was 17%. This must be attributed to the difference in specific area, which 50 m.$^2$/g. in Test (C) instead of 130 m.$^2$/g. in Test (A), all other variables being held constant.

Tests (D) and (E) were similar to Tests (A) and (B) in that the only variable was the amount of nickel. The carrier was the same in each test, but differed from the carrier in Tests (A) and (B) in that it was less pure and had less surface area. In Test (D) the amount of nickel was 80 parts by weight. In Test (E) was 50. In other words the difference in amount of nickel in Tests (A) and (B) and (D) and (E) was identical, i.e. 30 parts by weight. In Test (D) the conversion was 17%, and in Test (E) it was 10%. The difference was 7%.

Therefore, using a carrier of the invention, but differing in the amount of metal by 30 parts by weight, the activity improved 20%. Using a carrier not within the scope of the invention, and changing the amount of nickel by the same 30 parts by weight the activity improved only 7%. The improved activity of 20% is almost three times an improved activity of 7%. This is a difference in kind attributable to control of the parameters, aforesaid.

The unexpected advantages achieved by the catalysts of this invention are further illustrated in the examples.

In Example 2 a catalyst of the invention is utilized to hydrogenate furfuryl alcohol to the tetrahydro derivative. At a temperature of 150° C., a hydrogen feed rate of 4.5 m.$^3$/hr. and a furfuryl alcohol feed rate of 220 g./hr., the conversion rate is 99.8% and the yield is 89%.

Using a similar catalyst, but with a less pure silica carrier the productivity of the reaction bath is decreased by 59%, despite the fact that the feed rate of the alcohol is decreased, and therefore the time for reaction is increased.

Example 4 illustrates the reduction of 2-ethyl hexenol to 2-ethyl hexanol. In this example the productivity of the reaction bath is decreased by two thirds upon replacement of a catalyst of the invention with one in which the carrier is of lesser purity despite the lowering of the feed rate of the hexanol.

Similar improvements are illustrated in the other examples.

The following non-limiting examples are given by way of illustration only.

EXAMPLE 1

(A) Into a stainless steel vessel provided with stirring means there are introduced 60 grams of pure silica, "Aerosil," having a specific area of 130 m.$^2$/g. and a solution in 12 liters of water of 1200 grams of crystallized nickel nitrate $(NO_3)_2Ni.6H_2O$, thus 242 g. of nickel.

The mixture is heated to 95° C. under stirring, and there is introduced thereinto, within one hour, 1.06 liters of a 300 g./liter sodium hydroxide aqueous solution. This introduction increases the pH of the mixture up to 8.2. The temperature is then maintained at 95° C. for 15 minutes, with stirring. The mixture is then permitted to cool.

The solid mixture resulting from the precipitation is then introduced into a cone-shaped washing apparatus and washed for 24 hours with 8 liters per hour of water. The product is then allowed to settle in the cone for 5 hours and it is then filtered. The filtration cake is dried in a drying-room, at about 150° C. to obtain a product containing about 18–20% by weight of water. This product is ground and, in accordance with conventional techniques, put in the form of pellets of 11 mm. diameter and 11 mm. height. The catalyst pellets are then placed in a furnace in which they are subjected to reduction by hydrogen at 480° C.

The catalyst so prepared is placed in a reactor consisting of a tube of 80 cm. length and 28 mm. inside diameter and surrounded by a jacket through which circulates hot water under pressure by which the heat evolved by the reaction can be removed while the reactor is maintained at a temperature suitable for the reaction. The reaction tube is preceded by a vaporizer traversed by a hydrogen stream which therein becomes laden with vapors of compound to be hydrogenated, before entering the reactor. The reaction tube is followed by a condenser in which the vapors of the reaction product or products are condensed, the excess hydrogen, after admixture with fresh hydrogen, being taken by a blower and returned to the vaporizer. The purity of the hydrogen in the hydrogen circuit is maintained at the desired value by continuous discarding of a portion of the circulating hydrogen downstream with respect to the condenser and upstream with respect to the fresh hydrogen feed point.

The reactor is maintained at 160° C. and there is passed therethrough, per hour, 4 cubic meters of hydrogen of a purity maintained at 95% by volume and 550 g. of benzene vapors with which the hydrogen becomes laden in the vaporizer. Under these conditions the conversion of benzene to cyclohexane is substantially complete, the cyclohexane is substantially complete, the cyclohexane obtained containing only 0.22% by weight of benzene.

When the operation is carried out at the same temperature and with the same hydrogen purity in the circuit but with the hydrogen circulation rate being lowered to 1500 liters per hour and the benzene feed rate being lowered to 180 g./hr., the conversion is improved to the degree that the cyclohexane obtained contains only 0.01% by weight of benzene.

(B) For comparison, the operation was repeated but using a nickel-on-kieselguhr catalyst prepared as described above. With a hydrogen circulation rate of 2 m.$^3$/hr. and a benzene feed rate of 220 g./hr., only 80% of the benzene is converted. With a hydrogen circulation rate of 1500 liters/hr. and a benzene feed rate of 100 g./hr., only 98% of the benzene is converted.

(C) For further comparison, a nickel-on-silica catalyst was prepared using another grade of silica (Aerosil OX 50) in which the specific area was only 50 m.$^2$/g. The catalyst contained 80% by weight of nickel and the purity of the carrier was 99.9%.

It was found, on repeating the above described procedure, that with a hydrogen circulation rate of 2 m.³/hr. and a benzene feed rate of 220 g./hr. only 85% of the benzene was converted. With a hydrogen circulation rate of 1500 liters/hr. and a benzene feed rate of 100 g./hr. the amount of benzene converted increased to only 98.5%.

The results of these two comparison tests illustrate the importance of increased purity and surface area of the catalysts.

EXAMPLE 2

(A) There is used a nickel-on "Aerosil" catalyst prepared as in Example 1. The catalyst pellets are ground after their reduction, so that the catalyst can be used in divided state in suspension throughout a liquid. There is carried out in this manner liquid phase hydrogenation of furfuryl alcohol to tetrahydrofurfuryl alcohol.

The liquid reaction bath has a volume of 3 liters, contains the catalyst in suspension and is maintained at a temperature of 150° C. under atmospheric pressure. This bath is continuously traversed by a hydrogen stream at a rate of 4.5 m.³/hr. and is fed with 220 g./hr. of liquid furfuryl alcohol.

Under these conditions the conversion rate of the furfuryl alcohol is 99.8% and the tetrahydrofurfuryl alcohol yield is 89%.

(B) If the operation is repeated using the same amount of a catalyst prepared in a similar way but starting from kieselguhr instead of "Aerosil," there is obtained, for a furfuryl alcohol feed rate of only 100 g./hr., a conversion rate of 94% and a tetrahydrofurfuryl alcohol yield of 85%. The productivity of the bath is only 41% of that of the preceding bath.

EXAMPLE 3

(A) There is used a nickel-on-"Aerosil" catalyst prepared by the method described in Example 1 but starting from 30 g. of pure silica "Aerosil" having a specific area of 380 m.²/g. and 595 g. of crystallized nickel nitrate (NO₃)₂Ni.6H₂O, i.e. 120 g. of nickel.

After reduction and grinding of the catalyst pellets, the catalyst is introduced into a mixture of equal parts by weight of benzene and cyclohexane contained in an autoclave provided with stirring means and in which are maintained a hydrogen pressure of 10 bars and a temperature of 100° C. After 2 hours reaction under these conditions there remains less than 100 parts per million (p.p.m.) of unconverted benzene.

If the operation is repeated using, as a carrier, "Aerosil" having a specific area of 130 m.²/g. instead of 380 m.²/g., 2 hours and 30 minutes are required for the reaction mixture to contain less than 100 p.p.m. of unconverted benzene.

(B) if the operation is repeated using a catalyst prepared in a similar way but starting from kieselguhr instead of "Aerosil," only 30% of the benzene is hydrogenated after 2 hours and only 60% after 5 hours.

EXAMPLE 4

(A) Into a stainless steel vessel provided with stirring means there is introduced 120 g. of pure silica "Aerosil" having a specific area of 130 m.²/g., 2.2 liters of a 300 g./liter sodium hydroxide aqueous solution and 12 liters of water.

The mixture is heated to 95° C. under stirring and there is introduced thereinto, within 15 minutes, 2.2 liters of a 620 g./liter copper nitrate aqueous solution, i.e. 462 g. of copper. The temperature is then maintained at 95° C. for 4 hours, then the mixture is allowed to cool.

The solid mixture from the precipitation operation is washed in a cone-shaped washing apparatus with 10 liters per hour of water for 20 hours. The product is then allowed to settle in the cone for 5 hours, and is filtered. The filtration cake is dried at about 130° C. to obtain a product containing about 15% by weight of water. The wet product is ground, then pelleted as described in Example 1.

The catalyst pellets are placed in a reactor analogous to that of Example 1 but of 1.6 meters length. The reactor form spart of a reaction circuit similar to that of Example 1. In the reactor the catalyst pellets are reduced by hydrogen, at 160° C.

After the reduction, the reactor is maintained at 160° C. and there is passed therethrough, per hour, 1500 liters of hydrogen of a purity maintained at 85% by volume and 300 g. of 2-ethyl hexenal vapors with which the hydrogen becomes laden in the vaporizer. The conversion rate of the 2-ethyl hexenal to 2-ethyl hexanol is 99.3%.

(B) If the operation is repeated using a catalyst prepared in a similar way but starting from kieselguhr instead of "Aerosil," the conversion rate of 2-ethyl hexenal to 2-ethyl hexanol is only 96%, and if it is desired to reach a conversion rate of 99.3% it is necessary to lower the 2-ethyl hexenal feed rate to 200 g./hr., which results in a decrease of one third of the productivity of the reactor.

EXAMPLE 5

(A) There is used a copper-on-"Aerosil" catalyst prepared substantially as in Example 4 except that the precipitation step is carried out by introducing within 15 minutes into the mixture of sodium hydroxide and water a suspension of the silica "Aerosil" in the copper nitrate aqueous solution. After the reduction step the catalyst pellets are ground and the divided catalyst is utilized in the liquid phase hydrogenation of furfural to furfuryl alcohol.

The liquid bath has a volume of 3 liters, contains the divided catalyst in suspension and is maintained at 133° C. under atmospheric pressure. The bath is continuously traversed by 5.5 m.³/hr. of hydrogen and is fed with 320 g./hr. of liquid furfural.

The conversion rate of the furfural is 99%. The conversion rate to furfuryl alcohol amounts to 96.5% and to methylfuran, to 2.5%.

(B) If the operation is repeated using a catalyst prepared in a similar way but starting from kieselguhr instead of "Aerosil," it is necessary to carry out the hydrogenation at a temperature of 175° C. for obtaining a high conversion rate. However, there still remains 4% of unconverted furfural. With kieselguhr it is not possible to use temperatures as low as can be used with the catalyst deposited on "Aerosil," since at a temperature of 150° C., 20% of the furfural remains unconverted.

EXAMPLE 6

This example compares the results of a nickel on kieselguhr catalyst with a catalyst of the invention.

The catalyst used for comparison purposes was nickel on kieselguhr. The purity of the kieselguhr was 80%, the surface area of the kieselguhr was 60 m.²/g., and the metal content of the catalyst was 80%. This catalyst is Catalyst A (see below).

In the catalyst of the invention the purity of the silica was 99.5%, the surface area of the silica was 160 m.²/g., and the metal content of the silica was 80%. This catalyst is Catalyst B (see below).

The experiments were carried out in the following manner:

Toluylene diamine was produced by hydrogenation of dinitrotoluene (hereinafter referred to as TDA and DNT respectively) in an attempt to determine the highest productivity attainable by using the above mentioned catalysts, under exactly the same conditions.

Tests were carried out in an apparatus as diagrammatically illustrated in the accompanying drawing, which apparatus comprises:

(1) a cylindrical, vertical reactor 1 having an internal diameter of 54 mm. and a height of 2.70 m., provided with a perforated plate 2 at its bottom and a heating jacket 3 fed with superheated steam;

(2) two decanters 4 and 5;

(3) a condenser 6;

(4) a separating tower 7 filled in with packing materials and provided with a decanter 8; in this tower, hydrogen was substantially freed from the remaining liquids entrained therewith after condensation in condenser 6;

(5) a hydrogen washing tower 9 filled in with packing materials, using water;

(6) a compressor 10 of the "Rootes" type;

(7) a DNT reservoir 11, maintained at 75° C. by a heating coil 12.

At starting, reactor 1 was charged with a 25% solution of TDA in 2-ethyl-1-butanol, containing 350 g. of catalyst. The bath was brought to an maintained at 120° C., while introducing hydrogen through perforated plate 2 at a flow-rate of 1500 liters per hour. The hydrogen and reaction bath were thus maintained in a highly emulsified state, and a liquid stream containing some catalyst left reactor 1 through line 13, entered decanter 4, where the catalyst was partially separated as a lower layer, the upper layer entering decanter 5, where the whole of the catalyst remaining in suspension in the liquid stream was separated; due to the difference in specific weight between the reaction bath, which was relatively lighter, and the mixture constituting the lower layers of both decanters 4 and 5, which mixture contained far more catalyst than there was contained in the mixture in the reaction bath, the reaction mixture circulated, without any help of pumps, through reactor 1, line 13, decanters 4 and 5, lines 14 and 15, and line 16.

DNT was then introduced through line 17, as a 15% solution in 2-ethyl-1-butanol. Through line 13 there was withdrawn a liquid stream consisting essentially of 2-ethyl-1-butanol, TDA and catalyst, which stream entered decanter 4, in which it separated into two phases; the lower layer, consisting essentially of 2-ethyl-1-butanol and catalyst, was recycled through lines 14 and 16 to reactor 1; the upper layer, consisting essentially of 2-ethyl-1-butanol, TDA and a little catalyst remaining in suspension therethrough, entered decanter 5, the lower layer produced by decantation in decanter 5, consisting of 2-ethyl-1-butanol and catalyst, was returned to reactor 1 through lines 15 and 16. The upper layer was withdrawn through line 18 provided with a control valve 19, in the form of a 25% solution of TDA in 2-ethyl-1-butanol.

Excess hydrogen, which separated from the reaction bath in the upper part of reactor 1, and entrained reaction water, together with small amounts of 2-ethyl-1-butanol, and traces of TDA, evolved from the reactor through line 20, entered condenser 6 and then separating tower 7 through line 21, where it separated from the condensed compounds. The liquid mixture leaving tower 7 through line 22 at the bottom thereof entered decanter 8, and separated into two layers; the lower layer, consisting essentially of water, was withdrawn through line 23, while the upper layer returned to reactor 1 through line 16, provided with a control valve 24. Hydrogen left tower 7 in substantially pure state through line 25, and was partly discarded (about 20 liters per hour) through line 26, regulating valve 29 and washing column 9. The remainder returned to reactor 1 through line 28, compressor 10 and line 29.

Fresh hydrogen was fed through line 30, provided with a control valve 31.

The withdrawals of TDA and 2-ethyl-1-butanol were controlled, by means of regulating valves 19 and 24 respectively, so as to ensure maintenance of a constant concentration of 25% by weight of TDA in the reaction bath.

Tests were conducted, each during at least 7 hours running at equilibrium, and completion of the DNT hydrogenation was evidenced by checking that no further absorption of hydrogen occurred after stopping of the DNT feed to the reaction bath.

The results are shown in the following table, in which:

(1) A is a nickel-on-kieselguhr catalyst meeting only one of the three conditions of the products of this invention;

(2) B is a nickel-on-pure-silica catalyst according to the invention;

(3) The maximum feeds are expressed as grams per hour of 15% DNT solution in 2-ethyl 1-butanol;

(4) "DNT" refers to the DNT content in the liquid stream withdrawn through line 18, expressed in parts per million (p.p.m.); and (5) The productivities are expressed in grams of TDA produced per hour per liter of reaction bath.

| Catalyst | Maximum feed | DNT, p.p.m. | Yield, percent | Productivity |
|---|---|---|---|---|
| A | 2,135 | 178 | 98.7 | 39.5 |
| B | 3,540 | 24 | 98.8 | 158.3 |

From the above it is apparent that the use of the catalysts of the invention described resulted in an increase of approximately 75% in the production of toluylene diamine at a feed rate which is increased by about 65%.

EXAMPLE 7

This example illustrates the use of the catalysts of this invention in the methanization of carbon dioxide.

Methanization of carbon dioxide is a process for the purification of hydrogen containing carbon monoxide-carbon dioxide mixtures to produce a new mixture containing the lowest possible proportion of carbon monoxide. In the process the original mixture is passed over a hydrogenation catalyst.

The reaction is carried out in a tubular reactor comprising twenty tubes each having an inside diameter of 31 mm. and a height of 1.1 m. (internal volume therefore is about 1 liter). Hot water is circulated under pressure through the tubular reactor and around the reaction tubes to maintain the temperature at about 160° C. Each tube is filled with a nickel catalyst of the invention prepared as described in Example 1. The original mixture is recovered from an apparatus for the industrial preparation of diethyl ether by dehydrogenation of ethanol and contains, in addition to hydrogen, 5000 parts per million of carbon monoxide and 3000 parts per million of carbon dioxide. The mixture is fed to the reactor at a rate of 220 cubic meters per hour (measures under standard conditions at 20° C. and atmospheric pressure) while maintaining the reactor at an effective pressure of 25 kg./cm.$^2$. The gaseous stream leaving the reactor is cooled and when analyzed is found to contain only eight parts per million of carbon monoxide and 300 parts per million of carbon dioxide.

Electrolytically obtained hydrogen ordinarily contains about 10 parts per million of carbon monoxide.

The following table shows the values of the three important parameters utilized in defining the catalysts of this invention as illustrated in Examples 1A to 6B. A comparison of the results obtained in the examples will clearly illustrate the important advantages of the catalysts with respect to yield, productivity and other factors.

| Example | Purity, percent | Surface area, m.$^2$/g. | Metal content, percent |
|---|---|---|---|
| 1A | 99.5 | 130 | 80 |
| 1B | 80 | 60 | 80 |
| 1C | 99.9 | 50 | 80 |
| 2A | 99.5 | 130 | 80 |
| 2B | 80 | 60 | 80 |
| 3A | 99.5 | 380 | 80 |
| 3B | 80 | 60 | 80 |
| 4A | 99.8 | 130 | 80 |
| 4B | 80 | 60 | 80 |
| 5A | 99.8 | 130 | 80 |
| 5B | 80 | 60 | 80 |
| 6A | 80 | 60 | 80 |
| 6B | 99.5 | 160 | 80 |

What is claimed is:

1. A hydrogenation catalyst comprising nickel or copper deposited on a silica carrier wherein the purity of the carrier is at least 95% by weight and the specific surface area is at least 80 square meters per gram, the metal content of the catalyst being at least 70% with respect to the total weight of metal and carrier.

2. A catalyst as in claim 1 wherein the purity of the carrier is at least 99% by weight.

3. A catalyst as in claim 1 wherein the specific surface area of the carrier is at least 380 square meters per gram.

4. A catalyst as in claim 1 wherein the metal content is from 75% to 85%.

References Cited

UNITED STATES PATENTS

| | | | |
|---|---|---|---|
| 1,815,790 | 6/1931 | Marx et al. | 252—459 |
| 3,207,702 | 9/1965 | Flank et al. | 252—459 X |
| 3,328,477 | 6/1967 | Taylor et al. | 260—667 X |
| 3,427,361 | 2/1969 | Arnold | 260—667 |
| 3,461,181 | 8/1969 | Sato et al. | 260—667 |
| 3,514,492 | 5/1970 | Juguin et al. | 252—454 X |

DANIEL E. WYMAN, Primary Examiner

C. F. DEES, Assistant Examiner

U.S. Cl. X.R.

252—459